(12) United States Patent
Oberding et al.

(10) Patent No.: US 7,181,350 B2
(45) Date of Patent: Feb. 20, 2007

(54) BLOOD GLUCOSE METER/MODEM INTERFACE ARRANGEMENT

(75) Inventors: John W. Oberding, Clearwater, FL (US); Glen E. Geiger, St. Petersburg, FL (US); Kenneth D. White, Cocoa, FL (US); Reeder N. Ward, Melbourne, FL (US)

(73) Assignee: North America Technology Services, Inc., Pinellas Park, FL (US)

( * ) Notice: Subject to any disclaimer, the term of this patent is extended or adjusted under 35 U.S.C. 154(b) by 0 days.

(21) Appl. No.: 11/128,588

(22) Filed: May 13, 2005

(65) Prior Publication Data

US 2006/0261781 A1 Nov. 23, 2006

(51) Int. Cl.
*G01R 31/36* (2006.01)
*G01R 21/00* (2006.01)
(52) U.S. Cl. .............................. 702/62; 702/57; 702/63; 600/485; 600/501
(58) Field of Classification Search .................. 702/62, 702/63, 65, 57, 117, 122; 600/485, 501
See application file for complete search history.

(56) References Cited

U.S. PATENT DOCUMENTS

| 4,787,398 | A | * | 11/1988 | Garcia et al. ................ 600/583 |
| 6,141,583 | A | * | 10/2000 | Pape et al. ...................... 607/2 |
| 2005/0080345 | A1 | * | 4/2005 | Finburgh et al. ............. 600/485 |

* cited by examiner

*Primary Examiner*—Bryan Bui
(74) *Attorney, Agent, or Firm*—Allen, Dyer, Doppelt, Milbrath & Gilchrist, P.A.

(57) ABSTRACT

A cradle-configured interface for a hand-held blood glucose meter has a multi-electrical contact-containing battery door that enables blood glucose analysis data stored in the meter to be automatically downloaded to a modem within a meter cradle for transmission to a monitoring facility. Electrical contacts of the battery door are connected to conductors of the meter's printed circuit board when the battery door is closed. The cradle has spring-loaded probes connected to its internal modem and engaging the electrical contacts within the battery door when the meter is placed in the cradle. Upon sensing the meter in the cradle, the modem downloads blood sample analysis data stored in the meter into local memory and then transmits blood glucose analysis data to a downstream healthcare reporting site.

9 Claims, 6 Drawing Sheets

BLOOD GLUCOSE METER/MODEM INTERFACE ARRANGEMENT

FIELD OF THE INVENTION

The present invention relates in general to (medical) information storage and retrieval systems and subsystems therefor, and is particularly directed to an interface for a blood glucose meter and a communication modem, that enables information representative of the results of blood glucose analysis performed by and stored in the blood glucose meter to be automatically coupled to a communication modem for transmission to a processing station, such as may be installed at a doctor's office, clinic or other monitoring medical facility to which blood glucose information of patients is reported.

BACKGROUND OF THE INVENTION

Diabetic patients typically monitor their blood glucose levels at home or at other non-clinical sites by means of disposable test strips and a battery-powered, hand-held analyzer (blood glucose meter). As a non-limiting, such a meter may comprise a Home diagnostics Blood Glucose Meter, Model No. SIQ452, which has a configuration depicted in the front perspective view of FIG. 1 and the rear perspective view of FIG. 2. As shown therein, the front 10 of the blood glucose meter 1 has a blood sample strip-receiving region 11, into which the user inserts a disposable test strip containing a blood sample for analysis by the meter. The front of the meter also contains a display screen 12 that displays the results of the blood glucose analysis.

The back 20 of the meter contains a battery compartment 21, while a side region 30 of the meter contains a data communication port 31 through which the user may couple the meter to a data terminal device, such as a computer, or to a data communication device, such as a wireline or wireless modem. This dataport connection allows the results of a blood glucose analysis performed and stored by the meter to be reported via a telecommunication link to a healthcare facility that keeps track of the patient's progress over the course of a blood glucose treatment program.

A significant shortcoming associated with the use of medical devices of the type described above is the fact that the user, particularly an elderly person, may not have access to a computer or an associated modem, or be familiar with how to use such equipment. Indeed, very few patients use computer capture of data, and even fewer healthcare providers have direct access to this clinically valuable information. The only recourse is for the user to attempt to call a healthcare provider's information collection site with the information displayed on the screen—a chore that is problematic at best.

SUMMARY OF THE INVENTION

In accordance with the present invention, the task of reporting the results of a blood glucose analysis, as performed by a blood glucose measurement meter of the type described above, to a remote monitoring facility is considerably simplified, by means of a blood glucose meter/modem interface arrangement, which is configured to automatically download the results of the blood glucose analysis performed by the meter to a remote facility with minimum effort on the part of the user. All that is required of the user is to take a blood sample measurement with the blood glucose meter and then simply place the meter (the battery door of which has been modified in accordance with the present invention) into a modem-containing, meter cradle. Once the meter has been inserted into the cradle, blood glucose analysis information that has been stored in the meter is automatically read out and transmitted by the modem over a telecommunication link to data terminal equipment of a remote healthcare facility.

To this end, the invention modifies the meter's battery door by adding to it a plurality of electrical contacts. First portions of these contacts are arranged to be mechanically and electrically engaged with selected conductors of a printed circuit board within the meter, when the battery door closes the battery compartment. The selected conductors on the printed circuit board are those which are known to provide access to the meter's internal memory which stores data representative of the blood glucose analysis that is to be transmitted by the modem. The modified battery door further includes a protective shroud that is coupled to receive second portions of the electrical contacts. The protective shroud contains a plurality of apertures or bores through which external probe access is afforded to the second portions of the electrical contacts. Other than a reconfigured battery door, there is no modification to the meter.

In addition to modifying the battery door, the invention provides a meter cradle, that is sized and configured to receive and retain the blood glucose meter, such that the second ends of the electrical contacts that have been added to the meter's battery door become mechanically and electrically engaged by a plurality of spring-loaded electrical probes that are electrically connected to a modem within the meter cradle. With the first ends of the electrical contacts of the battery door engaging the selected conductors of the meter's printed circuit board, which provide electrical signals representative of the glucose analysis information, and with the second ends of those same electrical contacts being engaged by the spring-loaded electrical probes in the cradle, a communication path is formed between the selected conductors of the meter's printed circuit board and electrical links to the modem. The modem may now readily transmit blood glucose analysis information stored in the meter to a downstream reporting site.

DETAILED DESCRIPTION

Figure 1:
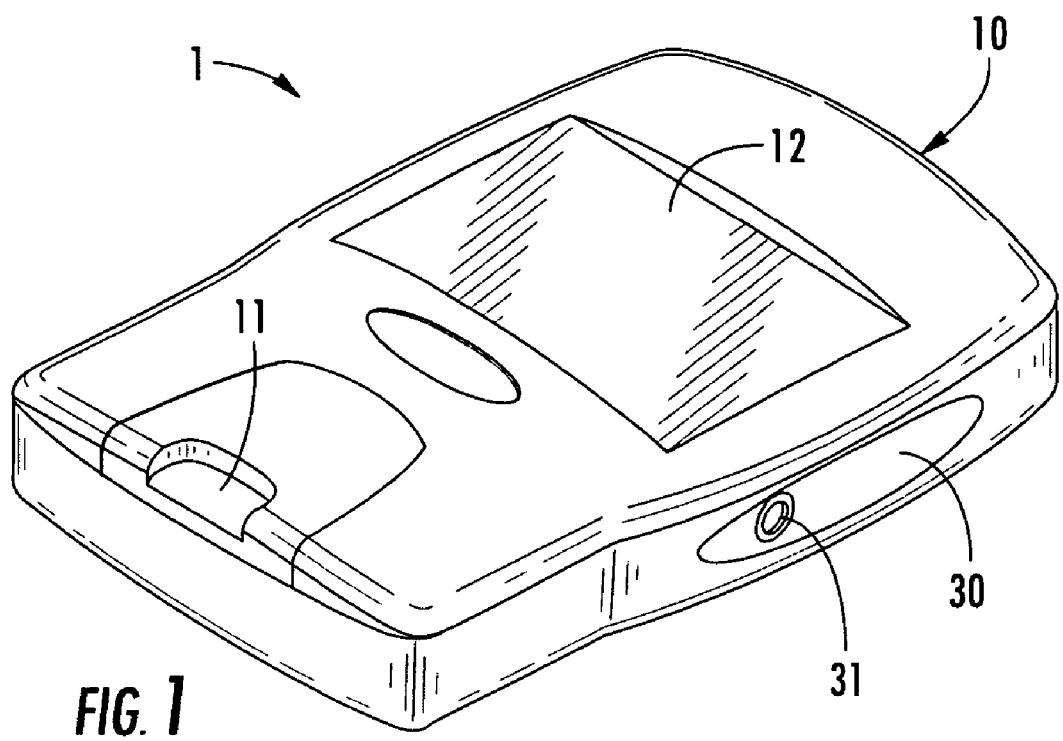
FIGS. 1 and 2 are respective front and rear perspective views of a conventional battery-powered blood glucose meter having a display screen and data communication port.
Figure 2:
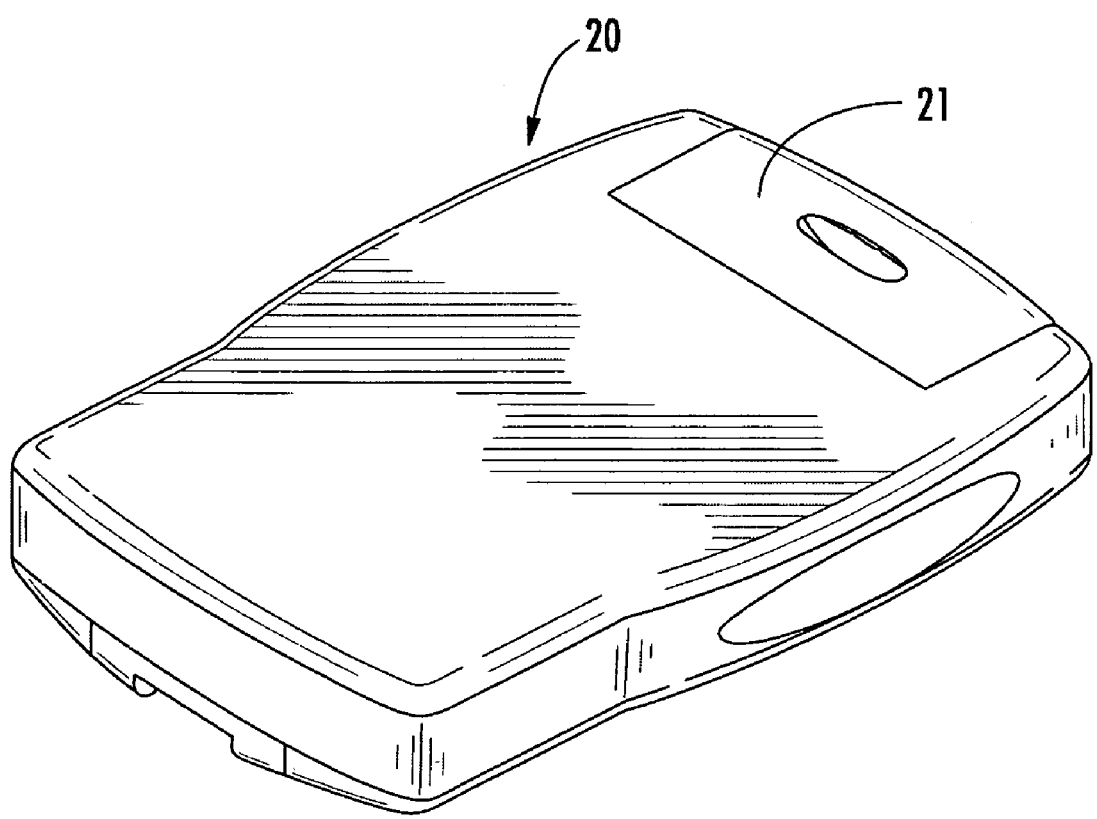
Figure 3:
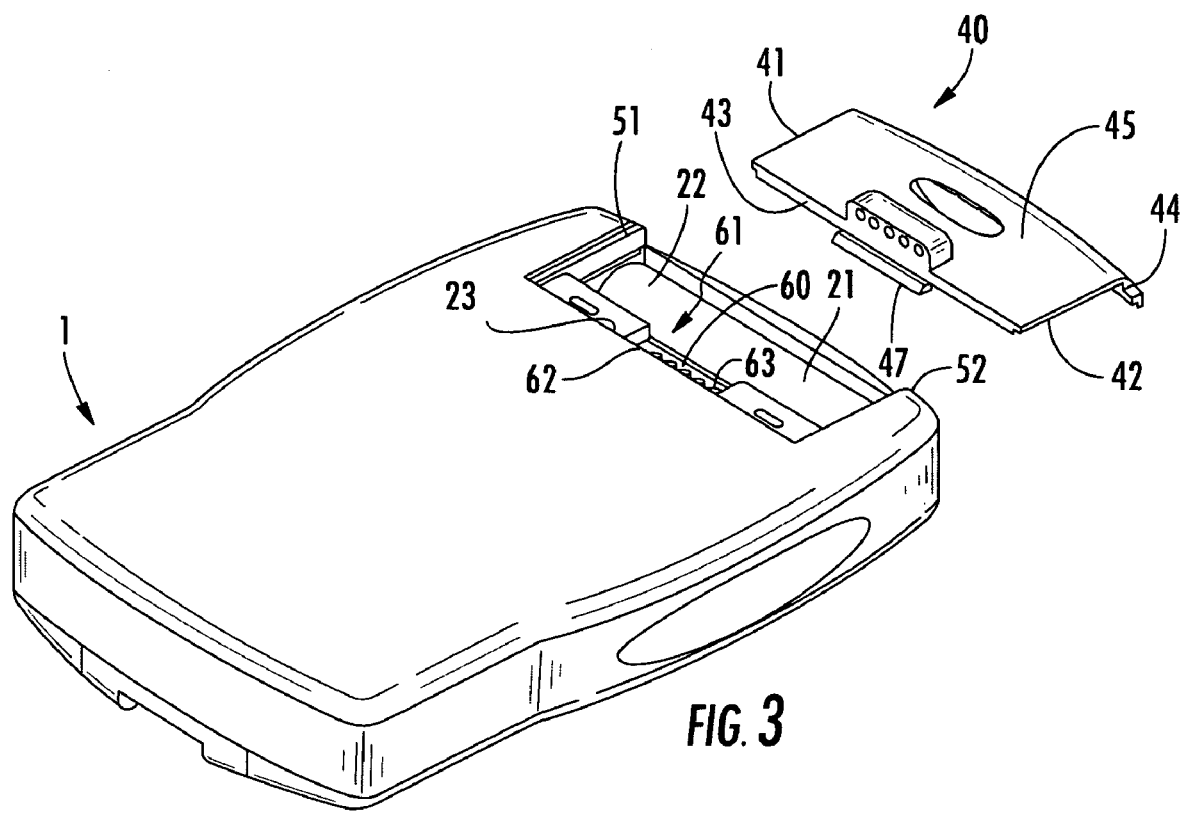
FIG. 3 is a partial rear perspective view of the blood glucose meter shown in FIGS. 1 and 2 and employing a modified, communication contact-containing battery door in accordance with the present invention.
Figure 4:
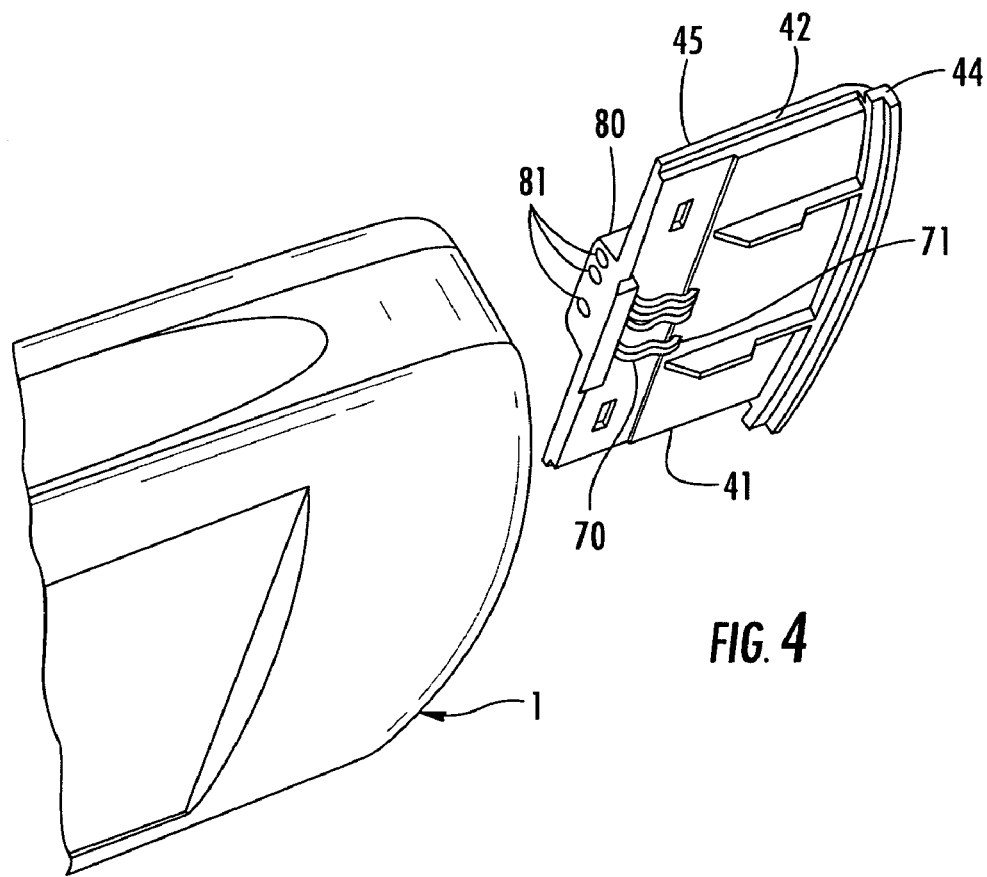
FIG. 4 is a partial front and side perspective view of the meter shown in FIG. 3 and showing a plurality of communication contacts on the underside of the battery door in accordance with the present invention.
Figure 5:
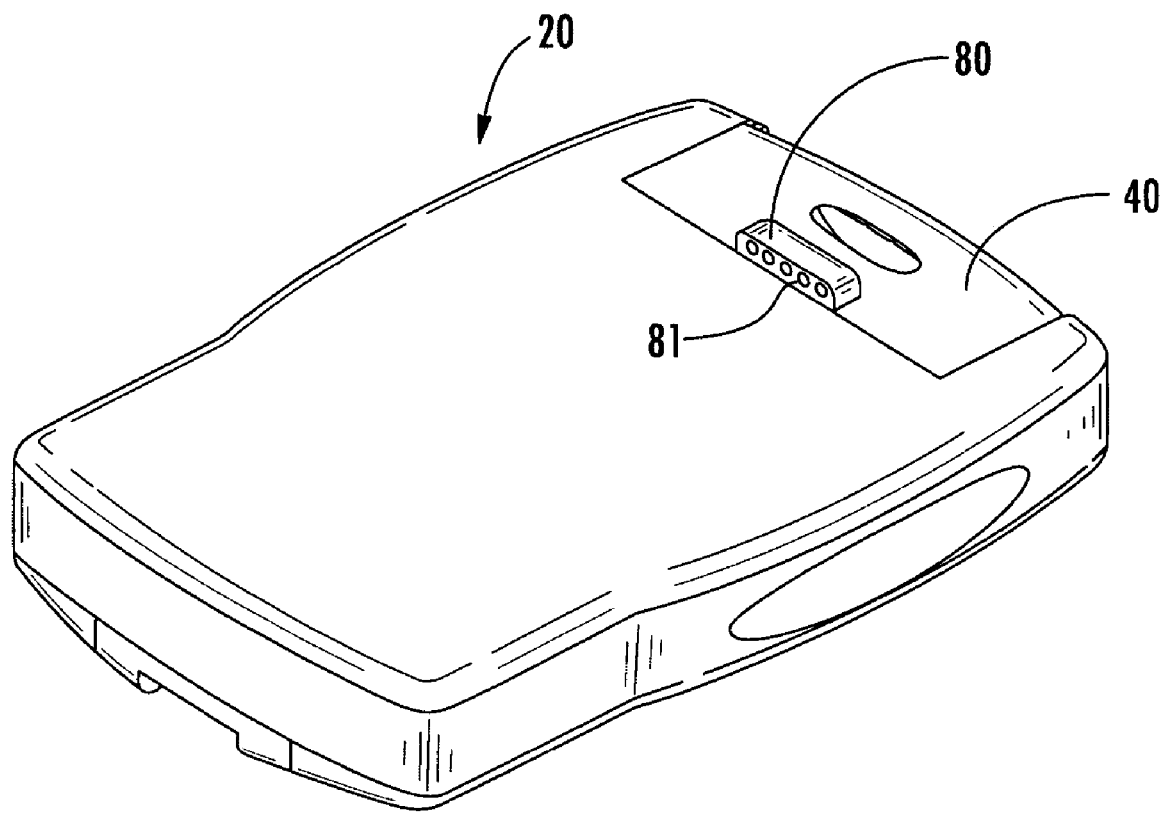
FIG. 5 is a rear perspective view of the blood glucose meter shown in FIGS. 3 and 4, with the battery door closed.

As pointed out briefly above, and as diagrammatically shown in FIGS. 3 and 4, the blood glucose meter in accordance with the invention is substantially the same in all respects to a conventional blood glucose meter, with the exception of the configuration of the door which closes the battery compartment of the meter. More particularly, as shown in FIG. 3, a battery door 40, which closes the battery compartment 21 (containing a battery shown at 22) in the manner shown in FIG. 5, has a pair of side edges 41 and 42 that are adapted to slide along a pair of associated ledges 51 and 52 at opposite ends of the battery compartment 21. The battery door further includes a front edge 43 that is adapted to abut against an associated front edge 23 of the battery compartment, while a rear wall portion 44 of the battery door 40 extends downwardly from a generally planar land region 45. When the battery door 40 closes the battery compartment 21, the rear wall portion 44 of the door forms part of the upper end surface of the meter. The generally planar land region 45 has a depression 46 to facilitate translation of the battery door by a finger of the user. Also extending from the front edge 43 of the battery door is a flange 47, that is adapted to slide over and close an exposed portion 61 of a printed circuit board 60 that contains the operative circuitry of the meter. Portion 61 of the printed circuit board 60 is exposed by a generally rectangular aperture or slot 62 that is formed in the rear panel of the meter immediately adjacent to the battery compartment. The purpose of the slot 62 is to allow the placement of test equipment probes against specified conductors 63 of the printed circuit board during factory testing of the meter prior to shipment.

It turns out that some of the conductors 63 on the printed circuit board 60 that are exposed by the slot 62 are the very conductors which provide access to the meter's on-board memory wherein information representative of the results of the meter's analysis of an inserted blood sample strip is stored. In particular, the conductors of interest on the printed circuit board 60 that are exposed by the slot 62 comprise three RS-232 conductors, comprised of a ground lead and two data communication leads.

Figure 6:
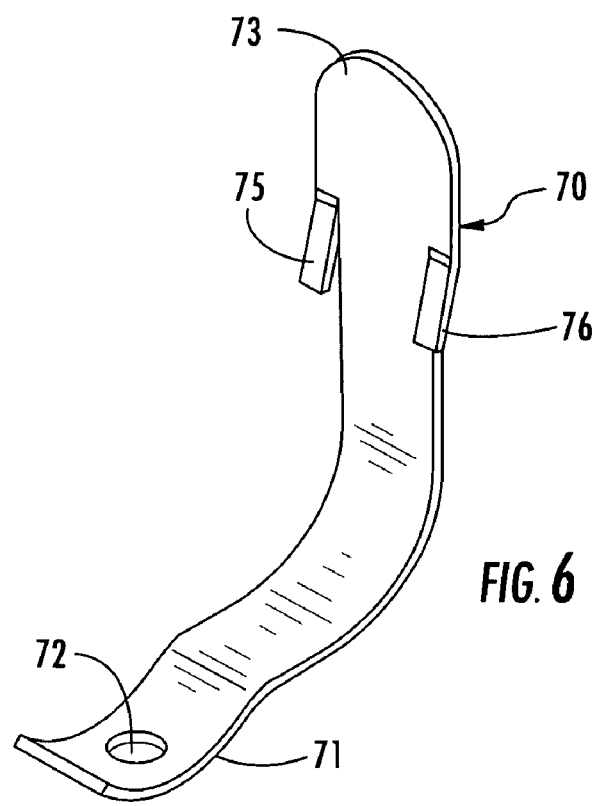
FIG. 6 shows the configuration of an individual electrical contact that is installed in the modified battery door according to the present invention.

The present invention takes advantage of the fact that these conductors are located immediately adjacent to the battery compartment, where external access may be provided by way of the battery door. In order to make solid electrical contact with the conductors 63, the present invention modifies the meter's battery door by the addition of a plurality of electrical contacts 70, the configuration of an individual one of which is shown in FIG. 6. As shown in 3 and also in FIG. 4, a first portion 71 of a respective electrical contact 70 is configured to mechanically and electrically engage a selected one of the conductors 63 of the printed circuit board 60 when the battery door 60 is closed over the battery compartment 21.

As pointed out above, the selected conductors are those which provide electrical signals representative of the glucose analysis information that is to be transmitted by the modem. As shown in FIG. 6, a rounded depression at the first portion 71 of a respective electrical contact 70 has a circular aperture or hole 72 therethrough. The sidewalls of aperture 72 provide a circular sharp edge that functions to scrape off any oxide on a solder bump terminal of a conductor 63, to ensure a solid electrical connection between the conductor and the contact. Being curved in the manner shown in FIG. 6 also provides the first portion 71 with a downward spring bias to urge the contact 70 into solid mechanical and electrical engagement with a conductor 63.

In order to provide external access to the electrical contacts 70, the battery door 60 further includes a protective shroud 80 that is located at the front edge 43 of the battery door and which is coupled to receive and retain second portions 73 of the electrical contacts. A respective electrical contact 70 is inserted into a slot therefor in the battery door and snaps into place by means of a pair of retainer tynes 75 and 76. External probe contact (from a modem-containing cradle, to be described) with a second portion 73 of an electrical contact is afforded by providing the protective shroud 80 with a plurality of bores or slots 81 that are aligned with second portions 73 of the electrical contacts 70. The bores 81 allow for the insertion of an associated set of modem-coupled probe leads, as described below.

Figure 7:
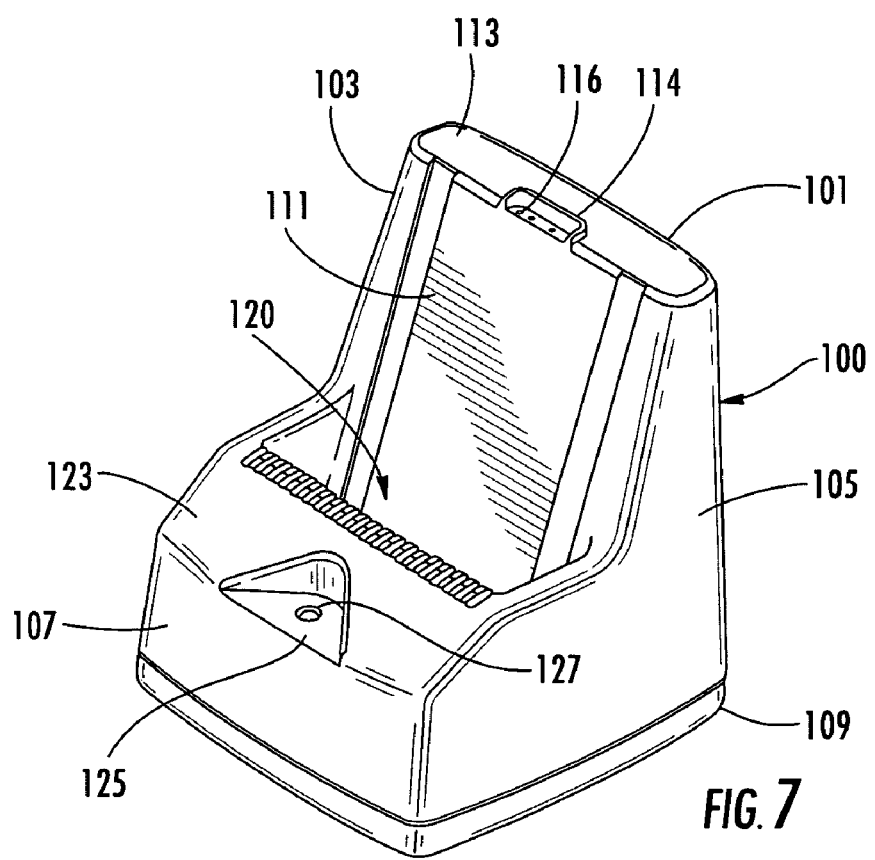
FIG. 7 diagrammatically illustrates the configuration of a modem-containing meter cradle in accordance with the present invention.
Figure 8:
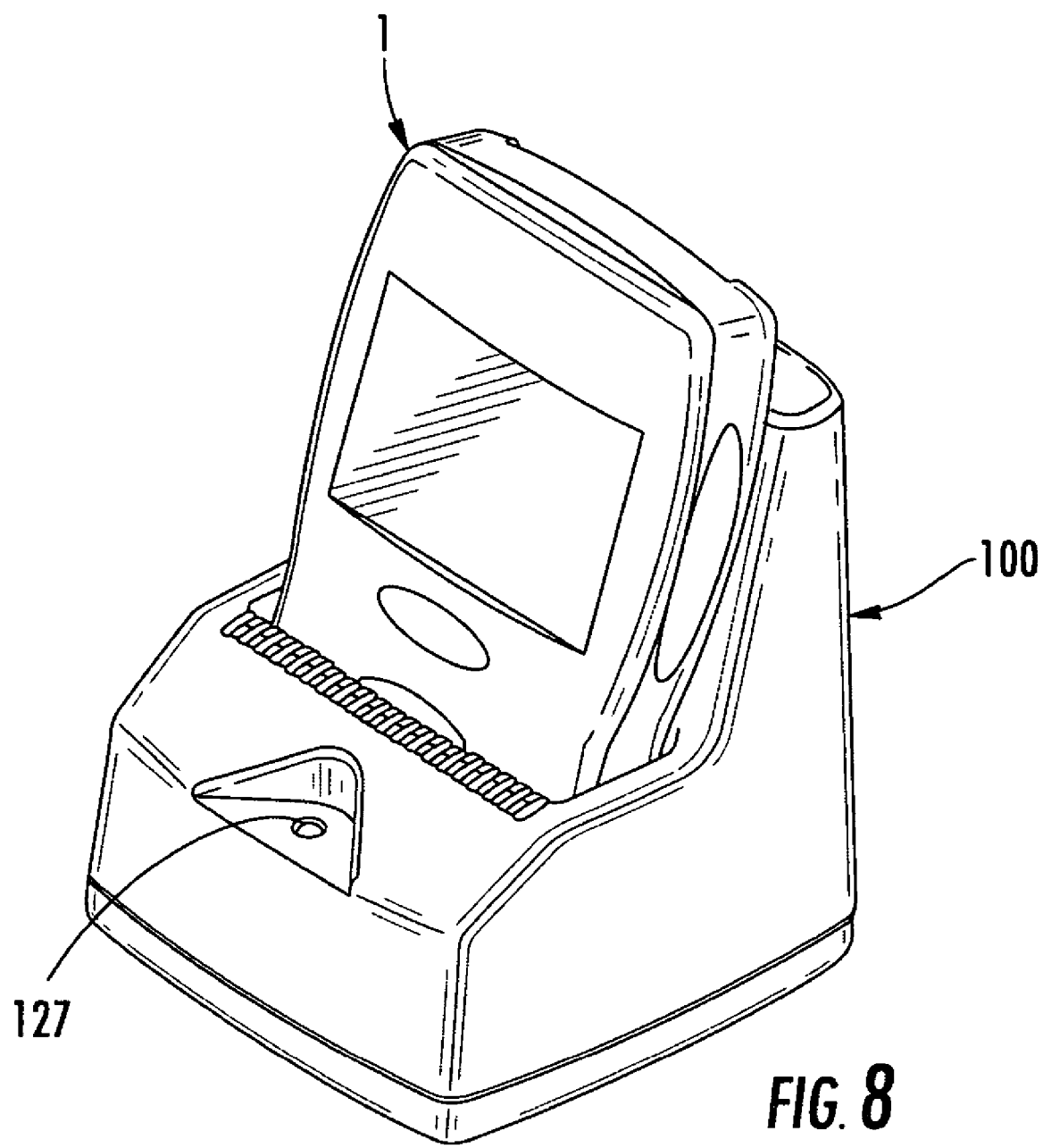
FIG. 8 diagrammatically illustrates the meter cradle of FIG. 6 into which a blood glucose meter employing the modified battery door of the present invention has been placed.

More particularly, FIG. 7 diagrammatically illustrates the housing configuration or body architecture of a meter cradle 100. As shown therein the meter cradle has a back wall 101, a pair of sidewalls 103 and 105, a front wall 107, and a base 109. The cradle further includes an inclined wall 111, which extends from a top wall 113 and terminates the rear portion of a meter-receiving and retention cavity 120 into which a blood glucose meter is insertable, as shown in FIG. 8. An aperture 114 is formed at a generally central portion of the intersection of the inclined wall 111 and the top wall 113. Aperture 114 is sized to accommodate a plurality of spring-loaded probe contacts 116, that are wired to an internal modem, and protrude from the top of the cradle, so that they may readily be inserted into the bores 81 of the shroud 80 when the meter is inserted into the cavity 120 in the manner shown in FIG. 8. The front of the cavity 120 is defined by a serrated wall 121 that extends between the sidewalls 103 and 105, and forms an upper edge of an inclined front wall 123, which extends between the sidewalls 103 and 105 and terminates at front wall 107. Inclined front wall 123 includes a recess 125 where a modem operation indicator 127, such a light emitting diode (LED), is placed.

Figure 9:
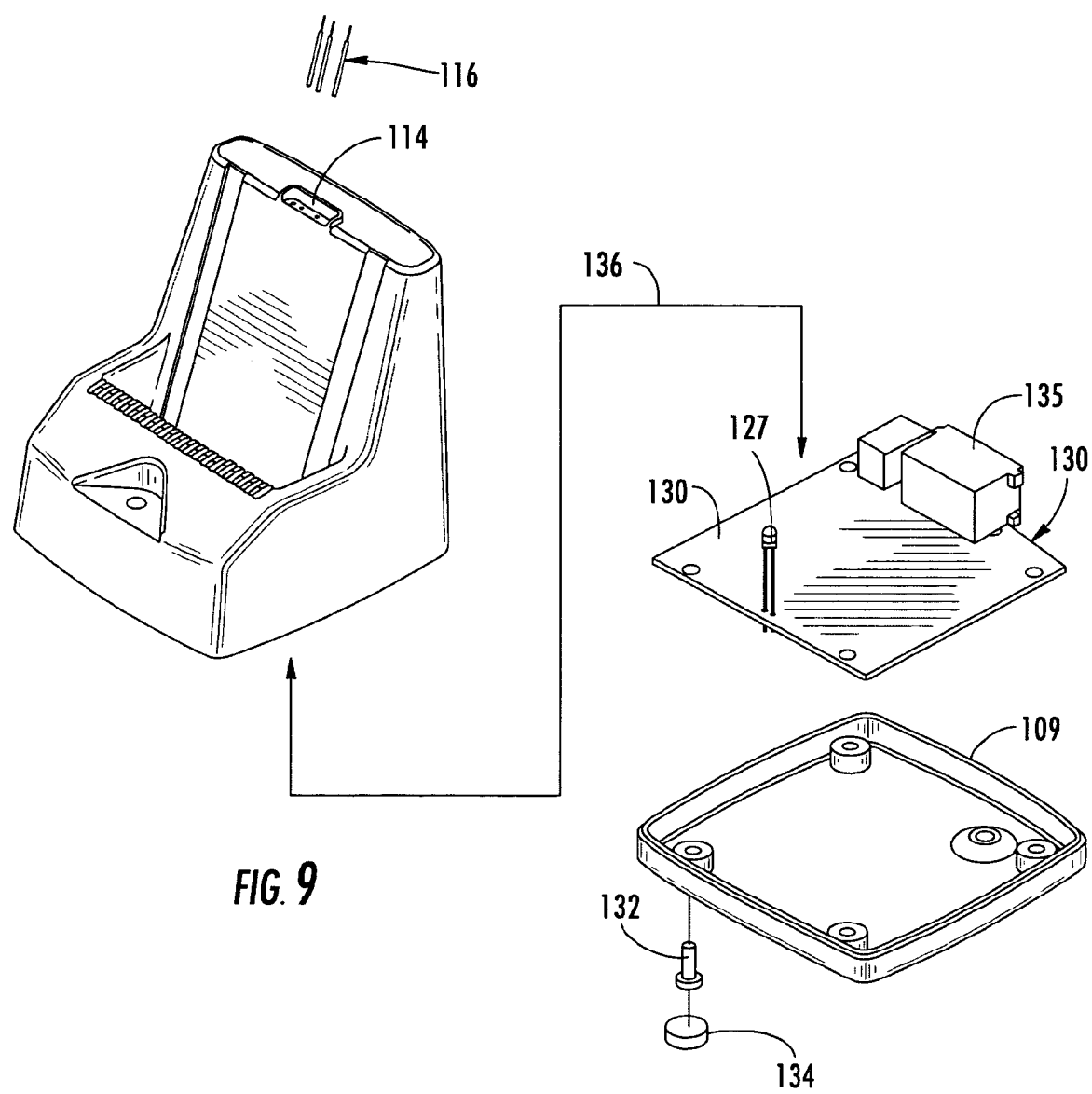
FIG. 9 is a diagrammatic exploded view of the modem-containing meter cradle of the present invention.

An exploded view of the meter cradle 100 is diagrammatically illustrated in FIG. 9. As shown therein, a modem printed circuit board 130 containing a modem 135, which is of conventional configuration, is mounted atop the base 109, with the base 109 and the printed circuit board 130 being secured to the cradle housing 100 by means of a set of screws 132. The screws, in turn, are covered with respective rubber feet or pads 134. A set of conductors shown by the double-arrowed lines 136 extend from the spring-loaded probe contacts 116 to the modem printed circuit board 130. Conductors 136 serve to complete connections between conductors 63 of the internal circuit board 60 of a blood glucose meter that has been inserted into the meter cradle and associated terminals the modem printed circuit board 130 within the meter cradle 100.

Use of the meter cradle 100 is straightforward. The blood glucose meter 1 is employed in a conventional manner as a user/patient inserts a disposable test strip containing a blood sample for analysis by the meter. The user then simply inserts the meter into the cradle cavity 120 in the manner shown in FIG. 8. As the meter comes to rest in the cavity, the spring-loaded probe contacts 116 that protrude from the aperture 114 at the top of the cradle pass into the bores 81 of the battery cover's shroud 80 and make mechanical and electrical contact with the second portions 73 of the electrical contacts 70 of the modified battery door.

As described previously, this effectively completes a communication path between selected conductors 63 of the meter's internal printed circuit board and electrical links 136 to the modem printed circuit board 130 within the meter cradle 100. Once the meter has been inserted into the cradle, electronic circuitry on the modem's printed circuit board senses its connections to the meter's data memory (as provided by the battery door-installed contacts) and initiates downloading blood sample analysis data stored in the meter's internal memory into a local memory on the modem printed circuit board 130. The modem then connects to a telephone line, dials a host computer, and proceeds to transmit the blood glucose analysis information it has obtained from the meter's on-board memory to a downstream healthcare reporting site, such as a clinic or doctor's office.

As will be appreciated from the foregoing description, the task of reporting, to a remote monitoring facility, the results of a blood glucose analysis performed by a hand-held blood glucose meter is considerably simplified by means of the blood glucose meter/modem interface arrangement of the present invention, which requires only a replacement of the meter's battery door, and the use of a reduced complexity meter cradle, which houses a conventional modem. As pointed out above, all that is required of the user is for the user to take a blood sample measurement with the blood glucose meter and then place the meter into a modem-containing cradle. Once the meter has been inserted into the cradle, the blood glucose analysis information that has been stored in the meter is automatically downloaded to the modem for transmission thereby over a telecommunication link to data terminal equipment of a remote healthcare facility.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. An arrangement for enabling information stored in a portable, battery-powered information collection device to be extracted therefrom, comprising a battery door that is adapted to close a battery compartment of said portable, battery-powered information collection device, said battery door having an electrical communication path therethrough that is adapted to be coupled to conductors of a printed circuit board housed within said battery-powered information collection device when said battery door closes said battery compartment, said electrical communication path being accessible externally of said portable, battery-powered information collection device.

2. The arrangement according to claim 1, wherein said electrical communication path comprises a plurality of electrical contacts having first portions thereof that are internal to said information collection device and engage selected conductors of said printed circuit board when said battery door closes said battery compartment, and having second portions thereof that are accessible externally of said portable, battery-powered information collection device.

3. The arrangement according to claim 2, wherein said battery door includes a protective shroud for said second portions of said electrical contacts, while allowing for electrical probe contacts with said second portions of said electrical contacts.

4. The arrangement according to claim 2, further comprising a cradle, which is sized and configured to receive and retain therein said portable, battery-powered information collection device, said cradle containing a modem that is adapted to be coupled to a communication link, and including a plurality of electrical probes that are electrically connected to said modem and are arranged to be engaged by said second portions of said electrical contacts within said battery door, when said portable, battery-powered information collection device is placed in said cradle.

5. The arrangement according to claim 4, wherein said electrical probes are spring loaded, so as to be urged into electrical contact with said second portions of said electrical contacts within said battery door when said portable, battery-powered information collection device is placed in said cradle.

6. The arrangement according to claim 1, wherein said portable, battery-powered information collection device comprises a blood glucose meter.

7. An arrangement for enabling information stored in a portable, battery-powered information collection device to be coupled to a communication link, comprising:

a battery door that is adapted to close a battery compartment of said portable, battery-powered information collection device, and having a plurality of electrical contacts, first portions of which are arranged to electrically engage selected conductors of a printed circuit board housed within said battery-powered information collection device when said battery door closes said battery compartment, said selected conductors being adapted to provide electrical signals representative of said information, said battery door further including a protective shroud coupled to receive second portions of said electrical contacts; and a cradle, which is sized and configured to receive and retain therein said portable, battery-powered information collection device, said cradle containing a modem that is adapted to be coupled to said communication link, and including a plurality of electrical probes that are electrically connected to said modem and are arranged to be engaged by said second portions of said electrical contacts within said protective shroud of said battery door when said portable, battery-powered information collection device is placed in said cradle.

8. The arrangement according to claim 7, wherein said electrical probes are spring loaded, so as to be urged into electrical contact with said second portions of said electrical contacts within said protective shroud of said battery door when said portable, battery-powered information collection device is placed in said cradle.

9. The arrangement according to claim 7, wherein said portable, battery-powered information collection device comprises a blood glucose meter.

* * * * *